US006537657B1

(12) United States Patent
Watanabe et al.

(10) Patent No.: US 6,537,657 B1
(45) Date of Patent: Mar. 25, 2003

(54) BIAXIALLY ORIENTED POLYESTER FILM FOR THERMAL TRANSFER RIBBON

(75) Inventors: Shinya Watanabe, Kanagawa (JP); Koji Furuya, Kanagawa (JP)

(73) Assignee: Teijin Limited, Osaka (JP)

( * ) Notice: Subject to any disclaimer, the term of this patent is extended or adjusted under 35 U.S.C. 154(b) by 0 days.

(21) Appl. No.: 09/762,231

(22) PCT Filed: Jun. 2, 2000

(86) PCT No.: PCT/JP00/03602

§ 371 (c)(1), (2), (4) Date: Aug. 6, 2001

(87) PCT Pub. No.: WO00/74947

PCT Pub. Date: Dec. 14, 2000

(30) Foreign Application Priority Data

Jun. 3, 1999 (JP) ........................................ 11-156498
Sep. 22, 1999 (JP) ........................................ 11-268382

(51) Int. Cl.$^7$ ........................ B32B 27/36; B32B 27/20; B32B 27/30; B32B 27/40

(52) U.S. Cl. .................... 428/331; 428/423.7; 428/480; 428/483; 428/910

(58) Field of Search ................................ 428/331, 323, 428/423.7, 480, 483, 910

(56) References Cited

U.S. PATENT DOCUMENTS

| | | | | |
|---|---|---|---|---|
| 5,185,314 A | | 2/1993 | Fujimura et al. | |
| 5,250,497 A | * | 10/1993 | Fujimura et al. | 347/217 |
| 5,407,724 A | * | 4/1995 | Mimura et al. | 428/141 |
| 6,139,952 A | * | 10/2000 | Furuya et al. | 200/512 |

FOREIGN PATENT DOCUMENTS

| | | |
|---|---|---|
| EP | 453579 | 10/1991 |
| JP | 2-162094 | 6/1990 |
| JP | 4-126293 | 4/1992 |

* cited by examiner

*Primary Examiner*—Vivian Chen
(74) *Attorney, Agent, or Firm*—Sughrue Mion, PLLC

(57) ABSTRACT

A biaxially oriented polyester film for a thermal transfer ribbon characterized in that the biaxially oriented polyester film comprises a copolymerized polyethylene-2,6-naphthalate obtained by polycondensing 90 to 99.9 mole % of 2,6-naphthalenedicarboxylic acid and 0.1 to 10 mole % of isophthalic acid as dicarboxylic acid component, and 97 to 100 mole % of ethylene glycol component and 0 to 30 mole % of diethylene glycol component as diol component, the alternating current volume resistivity of the molten product of the film is $66\times10^8$ Ωcm or less, the plane orientation coefficient of the film is 0.230 or more and 0.275 or less, and the density of the film is 1.3450 g/cm$^3$ or more.

10 Claims, 1 Drawing Sheet

BIAXIALLY ORIENTED POLYESTER FILM FOR THERMAL TRANSFER RIBBON

TECHNICAL FIELD

The present invention relates to a biaxially oriented polyester film for a thermal transfer ribbon. More specifically, this invention relates to a biaxially oriented film for a thermal transfer ribbon excellent in productivity [concretely, capable of increasing film forming speed (high speed film-forming performance), free from drop-out of particles from film in film forming process (abrasion resistance), free from breakage of film on slitting (slitting property)], and having excellent printing performance with no uneven transfer even in the case of high speed printing when it is used as a thermal transfer ribbon.

BACKGROUND ART

A thermal transfer recording system is a system for printing images and letters by transferring thermal ink contained in a thermal transfer ribbon by the heat generated from a thermal head to an image receiving paper. It has been popularized because of little printing sound and easiness in color printing.

Regarding the type of the thermal transfer recording, two types, i.e. heat melt type and sublimation type are practically used now. Out of them, the sublimation-type thermal transfer recording system is rapidly being popularized recent years as a recording system which can easily output high-quality full color images. The sublimation-type thermal transfer recording system has the following feature: a thermal transfer ribbon is constituted by laminating a layer of a thermal transfer ink having a composition consisting of a heat-sublimable dye dispersed in a binder on the surface of a base film; the obtained thermal transfer ribbon is laid on a transfer-receiving material (printing paper, film or the like); a thermal head is brought into contact with the thermal transfer ribbon to give heat energy to it; thereby, only the heat-sublimable dye at a heated position is sublimed; the sublimed dye is transferred to the image-receiving surface of the transfer-receiving material; and as a result, images and letters are printed.

Recently, it is required with the needs of speeding-up of printing to raise the thermal head temperature on printing and decrease the thickness of a thermal transfer ribbon, in other words, to reduce the thickness of film for the thermal transfer ribbon, in order to efficiently transmit heat from the thermal head to the thermal transfer ribbon.

However, the thinning of a film for thermal transfer ribbons is accompanied by the following problems.

Firstly, it becomes difficult to produce a film at high speed.

As a base film for thermal transfer ribbons, a biaxially oriented polyester film having excellent heat resistance, mechanical property and dimensional stability is used. As the polyester constituting the biaxially oriented polyester film, polyethylene terephthalate (hereafter, it is abbreviated as PET) and polyethylene-2,6-naphthalate (hereafter, it is abbreviated as PEN) are mainly used.

The biaxially oriented films like this are produced mainly by a consecutively biaxially stretching method. The consecutively biaxially stretching method is a process that molten polyester polymer is extruded from a die by an extruder into a sheet-shaped molten product, it is quenched on the surface of a rotary cooling drum, subsequently it is stretched in the longitudinal direction and the transverse direction, and further it is optionally subjected to a heat-setting treatment and a heat-relaxation treatment.

It is desirable that film forming can be carried out stably with a reduced breakage frequency to economically produce film in such a production method. Further, it is desired that surface faults are reduced and thickness homogeneity is increased in an obtained film. For that, it is necessary to increase the closeness of the above-mentioned film-shaped molten product to the surface of the rotary cooling drum. As the method for increasing the closeness, a method (called an electrostatic casting method) is known, that is, a wire-shaped electrode is placed in a vicinity of the extruding die and the rotary cooling drum to apply static charge on the surface of the film-shaped molten product, and the film-shaped molten product is quenched while it is brought into close contact with the surface of the rotary cooling drum.

However, having a larger molten electric resistance than PET, PEN has various more difficulties than the case of PET in a production of a thin PEN film for a base film of thermal transfer ribbons by electrostatic casting method. That is, when a PEN film is formed, the quantity of electrostatic charge to the surface of a film-shaped product per unit area becomes low due to thin thickness of the film-shaped molten product in the stage of electrostatic casting and further large molten electric resistance of PEN. Resultingly, the closeness between the film-shaped molten product and the surface of the rotary cooling drum is insufficient, and this causes troubles of inducing pin-shaped faults on the surface of a film, lowering of homogeneity of film thickness, and film breakage in an extreme case.

The second problem is the breakage of film during slitting.

Since a PEN film has a lower tear resistance than a PEN film, the PEN film is apt to break during slitting. The breakage of the PEN film is extreme when the film is thin. For example, a problem arises when a stretched film is slit or a thermo transfer ribbon is slit to get a product in the process of film production.

The third problem is the dropping-out of particles from film during film forming.

In polyester film, inert particles are commonly added to the polyester polymer to improve workability in a finishing process with the object of imparting slipperiness to film. However, when a film to be produced from an inert particle-added polymer is thin, the number of inert particles per unit area is decreased, the spaces between fine particles existing on the surface are widened, the film surface becomes too flat, and the slipperiness of the film tends to decrease. Therefore, in order to make up the decrease in slipperiness with decreasing thickness of the film, it is required that the concentration of added inert fine particles is increased, or the average particle diameter of the inert fine particles are increased with the decreasing thickness of the film.

In this case, the following problems occur: a great number of voids are generated on interfaces around the inert inorganic fine particles due to the lack of affinity between the inert fine particles and polyester polymer especially during melt extrusion or drawing with a high draw ratio, and as a result of the generation of voids, fine particles are apt to drop out from the obtained film, and abrasion dusts are generated by the contact with a roll to dirt the manufacturing process.

As the base film like this, a polyester film having a specified surface roughness is disclosed by JP-A 62-299389 (JP-A means Japanese unexamined patent publication), but this film cannot solve the above-mentioned problems.

Further, in a sublimation-type thermal transfer system, a heat-sublimable dye exists in a binder, only the dye sublimes by heat, and it is absorbed into an image receiving layer of a transfer-receiving paper to form a toning image. In order to allow only the dye to sublime, high adhesivity between the ink layer and the base material is required, and further it is necessary that environmental change nor time passage does not decrease the adhesivity. When the adhesivity is insufficient, it causes a trouble that whole of the ink layer is transferred to the transfer-receiving paper and toning is extremely lost. Since a polyester film generally has high crystalline orientation, the adhesivity between the film and an ink layer or the like is poor, and so it is hard for an ink layer to be closely adhered if it is directly applied on the polyester film. Hence, methods of applying a physical or chemical treatment on the surface of a film to increase the adhesivity to an ink layer conventionally have been proposed, but these conventional methods do not give sufficient adhesivity.

DISCLOSURE OF THE INVENTION

The object of the present invention is to provide a biaxially oriented polyester film for a thermal transfer ribbon capable of solving these problems, excellent in productivity (high-speed film-forming property, abrasion resistance and slitting property) and exhibiting no uneven transfer even in the case of high speed printing when it is used as a thermal transfer ribbon.

The inventors of the present invention found that the above-mentioned object of the present invention is achieved by the below-mentioned biaxially oriented polyester film for thermal transfer ribbon.

A biaxially oriented polyester film for a thermal transfer ribbon characterized in that it is a biaxially oriented film comprising a copolymerized polyethylene-2,6-naphthalate prepared by polycondensing 90 to 99.9 mole % of 2,6-naphthalenedicarboxylic acid and 0.1 to 10 mole % of isophthalic acid as a dicarboxylic acid component, and 97 to 100 mole % of ethylene glycol component and 0 to 3 mole % of diethylene glycol component as a diol component, the alternating-current volume resistivity of the molten product of the film is $6\times10^8$ Ωcm or less, the plane orientation coefficient of the film is 0.230 or more and 0.275 or less, and the density of the film is 1.3450 g/cm$^3$ or more.

Further, the biaxially oriented polyester film for a thermal transfer ribbon of the present invention preferably has the following features.

1. The thickness of the film is 0.5 to 10 μm.
2. The biaxially oriented film comprises a polyester obtained by compounding the copolymerized polyethylene-2,6-naphthalate with a sulfonic acid quaternary phosphonium salt having an ester-forming function group in an amount of 0.05 to 40 mmole % based on the total amount of the dicarboxylic acid components of the copolymerized polyethylene-2,6-naphthalate, and the alternating-current volume resistivity of the molten product of the film is $0.07\times10^8$ Ωcm or more and $6\times10^8$ Ωcm or less.
3. The biaxially oriented film comprises a composition obtained by compounding the copolymerized polyethylene-2,6-naphthalate with 0.1 to 2 wt. % of porous silica particles having an average particle diameter of 0.5 to 5 μm, and has protrusions of 0.8 μm or more existing on the surface of the film at the density of 100/mm$^2$ or more and 2000/mm$^2$ or less.
4. The biaxially oriented film comprises a composition obtained by compounding the copolymerized polyethylene-2,6-naphthalate with the porous silica particles described in the preceding section and additionally 0.05 to 2 wt. % of spherical silica particles having an average particle diameter of smaller than the thickness of the film and ranging from 0.01 to 0.8 μm, and having particle diameter ratios (major diameter/minor diameter) of 1.0 to 1.2.
5. The biaxially oriented film comprises a composition obtained by compounding the copolymerized polyethylene-2,6-naphthalate with 0.001 to 1.0 wt. % of spherical silica particles (A) having an average particle diameter of 0.5 to 5 μm and particle diameter ratios (major diameter/minor diameter) of 1.0 to 1.2, and 0.001 to 1.0 wt. % of spherical silica particles (B) having an average particle diameter smaller than that of the spherical silica particles (A) and ranging from 0.01 to 1 μm, and particle diameter ratios (major diameter/minor diameter) of 1.0 to 1.2.
6. When the biaxially oriented film is measured by a differential scanning calorimeter, there is a subpeak other than a melting point in the range from 225° C. to 245° C.
7. Protrusions of 1.5 μm or more exist on the surface of the film at most 50 pieces/mm$^2$.
8. Shrinkage factors in the longitudinal direction and the width direction after a treatment at 150° C. for 30 min are each 3% or less, shrinkage factors in the longitudinal direction and the width direction after a treatment at 200° C. for 10 min are each 5% or less, and shrinkage factors in the longitudinal direction and the width direction after a treatment at 230° C. for 10 min are each 10% or less.
9. An easily adhesive layer obtained by applying a coating solution containing an aqueous resin of at least one kind selected from a group consisting of urethane resin, a polyester resin, an acrylic resin and a vinyl resin-modified polyester resin on a film whose orientation crystallization has not been completed yet, and subsequently drying, stretching and heat setting, is laminated on at least one side.

Figure 1:
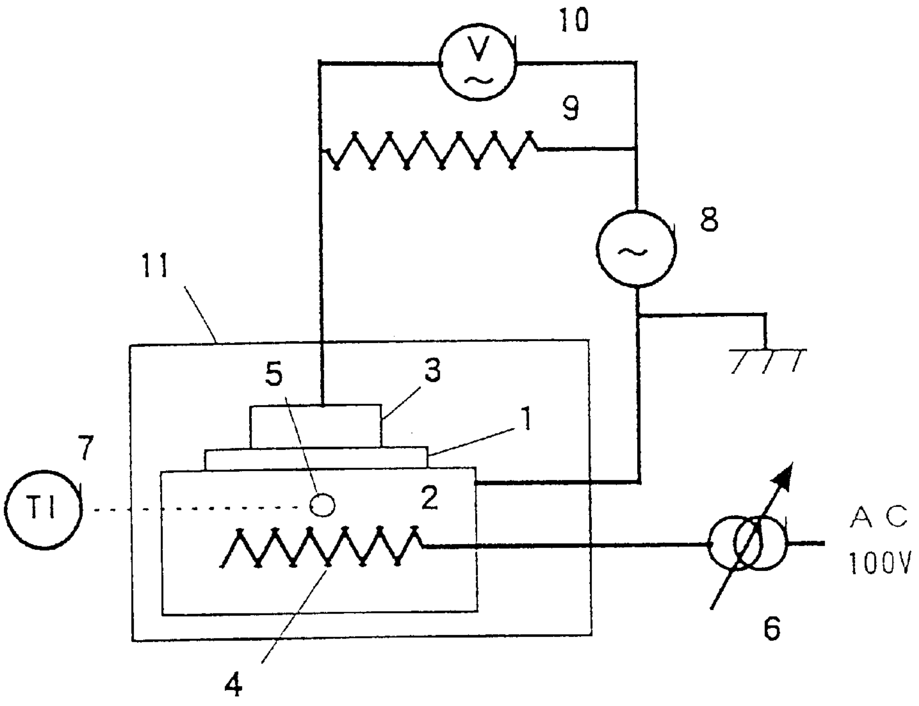
FIG. 1 shows an outline of an alternating-current volume resistivity-measuring apparatus.

The codes in FIG. 1 show the following, respectively.

1: A measuring sample.

2: A columnar lower electrode (diameter is 20 cm).

3: An upper electrode (diameter is 5.6 cm and thickness is 0.2 cm)

4: A voltage-applying device.

5: A temperature detecting terminal.

6: A power source.

7: A temperature display part.

8: A power source.

9: A reference resistance.

10: An electron meter.

11: A heat-insulating box.

BEST MODE FOR CARRYING OUT THE INVENTION

Polyester

A polyester constituting the biaxially oriented film of the present invention is a copolymerized polyethylene-2,6-naphthalate obtained by polycondensing 90 to 99.9 mole % of 2,6-naphthalenedicarboxylic acid and 0.1 to 10 mole % of isophthalic acid as a dicarboxylic acid component, and 97 to 100 mole % of ethylene glycol component and 0 to 3 mole % of diethylene glycol component as a diol component.

The copolymerized polyethylene-2,6-naphthalate (hereafter, abbreviated as copolymerized PEN) is obtained by copolymerizing an isophthalic acid component in an amount of 0.1 to 10 mole % based on the total dicarboxylic acid component. The upper limit of the copolymerization ratio of isophthalic acid is 10 mole %; however, it is preferably 8 mole %, more preferably 7 mole %. Further, the lower limit of the copolymerization ratio of isophthalic acid is 0.1 mole %; however, it is preferably 0.5 mole %, more preferably 1 mole %. when the copolymerization ratio of isophthalic acid is in the above range, the film will be excellent in slitting property and also in mechanical property.

When the copolymerization ratio of isophthalic acid is less than 0.1 mole %, the slitting property of the film is not improved, that is, film breakage will occur in some cases in a slitting process. On the other hand, when it exceeds 10 mole %, the crystallinity of the polymer is lost, and the mechanical strength of the film is poor. Further, the copolymerization ratio of isophthalic acid higher than that of another copolymerization component is preferable since the improving effect on slitting property of the film becomes excellent.

The copolymerized PEN may be produced, for example, by a so-called ester interchange reaction method (hereafter, it is abbreviated as EI-method in some cases), which uses dimethyl ester of 2,6-naphthalene dicarboxylic acid as a row material, or by a direct polymerization reaction method (hereafter, it is called as direct polymerization method for short in some cases), which uses 2,6-naphthalene dicarboxylic acid as a row material; however, the polymer produced by the EI-method, in which impurities in the copolymerized PEN are little, is preferred.

Copolymerization of isophthalic acid to a copolymerized PEN can be performed, for example, by using isophthalic acid or its ester forming derivative as a raw material in copolymerized polyester production. In the case of the above-mentioned direct polymerization method, isophthalic acid is preferably used as a raw material, and in the case of the EI-method, either isophthalic acid or an ester-forming derivative of isophthalic acid can be used. When isophthalic acid is used, it is preferable to add it at the point where the ester interchange reaction is substantially completed. Preferable examples of the ester-forming derivative of isophthalic acid include dimethyl isophthalate.

The diol component constituting the copolymerized PEN of the present invention comprises ethylene glycol or a combination of ethylene glycol and diethylene glycol in an amount of 3 mole % or less of the total amount of the diol components. The upper limit of the copolymerization ratio of the diethylene glycol component is 3 mole %; but preferably it is 2.5 mole %, more preferably 2 mole %. If the copolymerization ratio of the diethylene glycol component exceeds 3 mole %, the improving effect on slitting property of the film formed from it is large; however, since the crystallinity of the polymer is lost, the mechanical strength of the film widely decreases and during the use as a thermal transfer ribbon, deformation occurs on the film to lower letter/image-printing quality.

Further, the smaller the content of the diethylene glycol component is, preferably, the more excellent the mechanical properties are, and the lower limit of the copolymerization ratio is 0 mole %. However, since the diethylene glycol component is generated as a by-product in the reaction process for the production of a copolymerized product, and the component is naturally copolymerized. It is therefore difficult to make the copolymerization ratio of diethylene glycol 0 mole %. From the view point of productivity of the copolymerized PEN, the lower limit of the copolymerization ratio of diethylene glycol is preferably 0.5 mole %, more preferably 1 mole %.

As shown before, the smaller the content of diethylene glycol component is, the better it is, and so it is not preferable to add diethylene glycol or its ester forming derivative as a raw material on the production of a copolymerized PEN. In order to suppress the byproduction of diethylene glycol during the reaction in the process for producing the copolymerized PEN, the ratio of the amount of ethylene glycol to be added to the amount of dicarboxylic acid and/or its ester forming derivative by mole is preferably set in the range of 2.0 to 3.0. Further, the shorter the time needed for ester interchange reaction is, the better it is.

The copolymerized PEN of the present invention may contain polymerization components other than 2,6-naphthalenedicarboxylic acid, ethylene glycol, isophthalic acid and diethylene glycol. Such components have improving effects on the slitting property, but since they widely decrease Young's modulus, they are preferably not used in a large amount. The amount is 3 mole % or less, preferably 1 mole % or less, further preferably 0.1 mole % or less in total.

Examples of the polymerization component other than 2,6-naphthalenedicarboxylic acid, ethylene glycol, isophthalic acid and diethylene glycol include

- compounds having two ester forming functional groups, for example, oxalic acid, adipic acid, phthalic acid, sebacic acid, dodecanedicarboxylic acid, succinic acid, 5-sodiumsulfoisophthalic acid, terephthalic acid, 2-potassiumsulfoterephthalic acid, 2,7-naphthalene dicarboxylic acid, 1,4-cyclohexanedicarboxylic acid, 4,4'-diphenyldicarboxylic acid, phenylindandicarboxylic acid and diphenyletherdicarboxylic acid, and lower alkyl esters of these acids,
- oxycarboxylic acids such as p-oxyethoxybenzoic acid, and lower alkyl esters of such an acid, and
- propylene glycol, 1,2-propanediol, 1,3-butanediol, 1,4-butanediol, 1,5-pentanediol, 1,6-hexanediol, 1,2-cyclohexanedimethanol, 1,3-cyclohexanedimethanol, 1,4-cyclohexanedimethanol, p-xylylene glycol, ethylene glycol adducts of bisphenol A, ethylene glycol adducts of bisphenol sulfone, triethylene glycol, polyethylene oxide glycols, polytetramethylene oxide glycols, neopentyl glycol and others.

Further, in the copolymerized PEN, a part or all of its terminal hydroxyl groups and/or carboxyl groups may be blocked, for example, with a monofunctional compound such as benzoic acid or methoxypolyalkylene glycol, or may be modified, for example, with a very small amount of an ester forming compound having three or more functional groups such as glycerin or pentaerythritol in the range where a substantially linear polymer is obtained.

When the copolymerized PEN is produced by EI-method, a manganese compound is preferably used as an ester interchange reaction catalyst. The manganese compounds include oxides, chlorides, carbonates, carboxylic acid salts and the like, and among them, the succinic acid salt is especially preferred.

During the course of the production of the copolymerized PEN, a phosphorus compound is preferably added at the point when the ester interchange reaction has been substantially completed, to deactivate the ester interchange catalyst. As the phosphorus compound, trimethyl phosphate, triethyl phosphate, tri-n-butyl phosphate and orthophosphoric acid are preferably used. Among them, trimethyl phosphate is especially preferable.

As a polycondensation catalyst, an antimony compound is preferably used, and as the antimony compound, antimony trioxide is especially preferable.

The copolymerized PEN of the present invention preferably contains the above-mentioned catalysts in amounts satisfying the following three equations.

$$30 \leqq Mn \leqq 100$$

$$150 \leqq Sb \leqq 450$$

$$P/Mn \geqq 1$$

In the above equations, Mn, Sb and P express the amount (ppm) of manganese element, that of antimony element and that of phosphorus element in the copolymerized PEN, respectively.

When the content of manganese element is less than 30 ppm in the copolymerized PEN, the ester interchange reaction proceeds insufficiently, and on the other hand, when it exceeds 100 ppm, it is overmuch and uneconomical. In addition, when the content of antimony element is less than 150 ppm, polycondensation reactivity decreases and productivity is lowered. On the other hand, it exceeds 450 ppm, the heat stability of the film is poor, and in-process breakage during film formation and the decrease in mechanical strength occur sometimes. Further, the ratio P/Mn of less than 1 sometimes causes the decrease in the intrinsic viscosity.

Alternating current volume resistivity of the molten product of a film

Preferable examples of the production method for the biaxially oriented film of the present invention include a successively biaxially stretching method. The successively biaxially stretching method is carried out by extruding a molten product of a copolymerized PEN onto a rotary cooling drum through a slit die, for example, to a thickness of 10 to 200 $\mu$m, successively making the film come into close contact with the cooling drum homogeneously, and cooling the film on the cooling drum. The molten film extruded onto the rotary cooling drum is compulsively provided with electric charges in the vicinity of (directly before) the point where the film reaches the drum, in a noncontact manner, from an electrode placed, for example, in the space at a distance of 3 to 10 mm from the film surface. When provided with such electric charges, even a thin film-shaped matter comes into close contact with the rotary cooling drum homogeneously.

One of the methods for increasing film productivity is the increasing in the film forming speed by increasing rotary speed of the cooling drum. However, when the rotary speed of the cooling drum is increased excessively, the film-shaped matter cannot come into close contact with the cooling drum, and unevenness in thickness large becomes large; and as a result, a problem of large unevenness in film thickness occurs. Hence, there is conventionally a specific upper limit in the rotary speed of a cooling drum.

As the result of the studies on the above-mentioned technical matters, the inventors of the present invention found that the alternating-current volume resistivity of the molten product of a copolymerized PEN has closer relation with the amount of the electric charges capable of being imparted to the surface of the molten product of polyester film compared with the direct-current volume resistivity. And, they found that when the alternating-current volume resistivity of the molten product of the copolymerized PEN is made $6.0\times10^8$ Ω.cm or less, one can impart electric charges to the copolymerized PEN in an amount sufficient for making the film come into close contact even with a cooling drum rotating at a relatively high speed, and as a result, they found that even when the rotary speed of the cooling drum is increased higher than before, film thickness unevenness does not occur and productivity can be increased.

The range of the alternating-current volume resistivity of the molten product of a copolymerization PEN is preferably $5.0\times10^6$ to $6.0\times10^8$ Ω.cm, further preferably $0.07\times10^8$ to $6.0\times10^8$ Ω.cm.

A method for adding a sulfonic acid quaternary phosphonium salt having an ester-forming functional group to the copolymerized PEN can be used as a means for controlling the alternating-current volume resistivity of film molten product into the above-mentioned range. As the a sulfonic acid quaternary phosphonium salt having an ester-forming function group, for example, a compound expressed by the following formula is preferably used.

$$\begin{array}{l} X^1\text{—}A\text{—}X^2 \\ \quad\ \ | \\ (SO_3{\cdot}P\text{——}R^1, \text{——}R^2, \text{——}R^3, \text{——}R^4)_n \end{array}$$

In the above formula, n is an integer of 1 or 2, A is a $C_{2-18}$ aliphatic or aromatic group of (n+2) valent, for example, trivalent (n=1), or tetravalent (n=2). As the aliphatic group, for example, a $C_{2-10}$ normal or branched, saturated or unsaturated hydrocarbon is more preferable. Further, as the aromatic group, a $C_{6-18}$ aromatic group is preferable, and more preferable examples of the aromatic group include trivalent or tetravalent benzene structures, naphthalene structures and biphenyl structure. These aromatic groups may be substituted, for example, with a $C_{1-12}$ alkyl group or the like besides $X^1$, $X^2$ and a sulfonic acid quaternary phosphonium salt group.

$X^1$ and $X^2$ may be identical to or different from each other, and they are hydrogen or an ester-forming functional group. When $X^1$ and $X^2$ are a hydrogen atom at the same time, a copolymerizable group is absent in a polyester chain, and thereby $X^1$and $X^2$are not hydrogen atoms at the same time, and at least one of them must be an ester forming functional group.

The ester forming function group is, for example, $—OOCR^5$, $—COOH$, $—COOR^6$, $—C_mH_{2m}OH$, $—(OC_pH_{2p})_qOH$, $—CH_2—(OC_rH_{2r})_sOH$ or the like. In these groups, $R^5$ and $R^6$ are each a $C_{1-4}$ lower alkyl group or a phenyl group, m is an integer of 2 to 10, p and r are each an integer of 2 to 4, and q and s are each an integer of 1 or more, for example, an integer of 1 to 100. Lower alkyl groups of $R^5$ and $R^6$ may be each either normal or branched, and preferable examples include methyl, ethyl, n-propyl, isopropyl, n-butyl, sec-butyl and the like.

Further, $R^1$, $R^2$, $R_3$ and $R^4$, which constitute a part of the sulfonic acid phosphonium salt group, are identical to or different from each other, and they are a $C_{1-18}$ alkyl or benzyl group, or a $C_{6-12}$ aryl group. The $C_{1-18}$ alkyl group may be either normal or branched. Examples of the alkyl group include methyl, ethyl, propyl, butyl, dodecyl and stearyl groups, and the like. Preferable examples of the $C_{6-12}$ aryl group include phenyl, naphthyl and biphenyl groups, and the like. These aryl groups or the phenyl part of benzyl group may be substituted, for example, with a halogen atom, a nitro group or a $C_{1-4}$ lower alkyl group.

Concrete preferable examples of the above-mentioned sulfonium acid quaternary phosponium salt include tetrabutylphosphonium
3,5-dicarboxybenzenesulfonate, ethyltributylphosphonium
3,5-dicarboxybenzenesulfonate, benzyltributylphosphonium
3,5-dicarboxybenzenesulfonate, phenyltributylphosphonium
3,5-dicarboxybenzenesulfonate, tetraphenylphosphonium
3,5-dicarboxybenzenesulfonate, ethyltriphenylphosphonium
3,5-dicarboxybenzenesulfonate, butyltriphenylphosphonium
3,5-dicarboxybenzenesulfonate, benzyltriphenylphosphonium
3,5-dicarboxybenzenesulfonate, tetrabutylphosphonium
3,5-dicarbomethoxybenzenesulfonate, ethyltributylphosphonium
3,5-dicarbomethoxybenzenesulfonate, benzyltributylphosphonium
3,5-dicarbomethoxybenzenesulfonate, phenyltributylphosphonium
3,5-dicarbomethoxybenzenesulfonate, tetraphenylphosphonium
3,5-dicarbomethoxybenzenesulfonate, ethyltriphenylphosphonium
3,5-dicarbomethoxybenzenesulfonate, butyltriphenylphosphonium
3,5-dicarbomethoxybenzenesulfonate, benzyltriphenylphosphonium
3,5-dicarbomethoxybenzenesulfonate, tetrabutylphosphonium
3-carboxybenzenesulfonate, tetraphenylphosphonium
3-carboxybenzenesulfonate, tetrabutylphosphonium
3-carbomethoxybenzenesulfonate, tetraphenylphosphonium
3-carbomethoxybenzenesulfonate, tetrabutylphosphonium
3,5-di(β-hydroxyethoxycarbonyl-benzenesulfonate, tetraphenylphosphonium 3,5-di(β-hydroxyethoxycarbonyl) benzenesulfonate, tetrabutylphosphonium 3-(β-hydroxyethoxycarbonyl)benzenesulfonate, tetraphenylphosphonium 3-(β-hydroxyethoxycarbonyl) benzenesulfonate, tetrabutylphosphonium 4-hydroxyethoxybenzenesulfonate, bisphenol-A-3,3'-di (sulfonic acid tetrabutylphosphonium salt), tetrabutylphosphonium 2,6-dicarboxynaphthalene-4-sulfonate, α-tetrabutylphosphonium sulfosuccinate, and the like. The sulfonic acid quaternary phosphonium salt may be added singly with only one kind or in combination of two or more kinds.

Such a sulfonic acid quaternary phosphonium salt can be easily produced generally by a known reaction of a corresponding sulfonic acid with a corresponding phosphine, or by a known reaction of a corresponding sulfonic acid metal salt with a corresponding quaternary phosphonium halide.

The biaxially oriented film of the present invention contains the above-mentioned sulfonic acid quaternary phosphonium salt in an amount of 0.05 to 40 mmole %, preferably 0.1 to 20 mmole %, further preferably 0.2 to 10 mmole % based on the total amount of the dicarboxylic acid components constituting the copolymerized PEN.

Further, different from, for example, a modified polyester containing a sulfonic acid quaternary phosphonium salt in an amount sufficient for becoming dyeing seats of a cationic dye, the copolymerized PEN of the present invention or the like is a polyester containing the sulfonic acid quaternary phosphonium salt in such an amount that the lowering of physical properties of the polyester caused by the salt, for example, the lowering of the softening point of the like can be substantially neglected, and it shows physical properties almost comparable to those of a polyester containing no sulfonic acid quaternary phosphonium salt.

In the present invention, the addition of a sulfonic acid quaternary phosphonium salt into the biaxially oriented film can be performed by a known arbitrary method. For example, a method of adding the compound during the polymerization of the copolymerized PEN and carrying out the copolymerization in the presence of the compound, a method of adding the compound to the copolymerized PEN before film forming, a method of preparing a polymer composition (master chips) containing the compound in high concentration and mixing the polymer composition in a specific amount before melting the copolymerized PEN polymer, or the like can be used. By either method, the desired effect is developed as far as the sulfonic acid quaternary phosphium salt is contained in a specified amount in the film finally.

The alternating-current volume resistivity of the molten product of the biaxially oriented polyester film of the present invention can be made $6\times10^8$ Ω.cm or less by controlling the kind and the amount of the above-mentioned sulfonic acid quaternary phosphonium salt added.

Endothermic subpeak temperature

It is preferable that the biaxially oriented film of the present invention has an endothermic subpeak temperature, besides the melting point, determined by a differential scanning calorimeter (DSC) in the range from 225° C. to 245° C. The temperature range is more preferably 230° C. to 245° C., especially preferably 235° C. to 245° C., the most preferably 240° C. to 245° C. But, the peak present near 240° C. becomes a shoulder when it overlaps the melting point. In this case, the peak observed by subtracting the background of the melting point peak is let the endothermic subpeak.

The biaxially oriented film of the present invention holds stable physical properties and keeps dimensional stability up to the endothermic subpeak when it is heated. In the case where the above-mentioned endothermic subpeak temperature exists only below 225° C., thermal dimensional stability of the film becomes poor when the heat larger than that corresponding the temperature is given to the film.

Since it is used for a thermal transfer ribbon, the biaxially oriented film of the present invention can not have large dimensional change attributable to the heat given to the thermal head of a thermal transfer printer. It is effective for reducing such a dimensional change to set above-mentioned endothermic subpeak temperature in the above-mentioned range.

The endothermic subpeak temperature can be set in the above range by controlling the below-mentioned film forming conditions. Concretely, a heat-setting temperature in the film forming process is et high, especially at 225° C. or higher.

The endothermic subpeak is preferably 245° C. or lower. When it is higher than 245° C., planarity is undesirably lost. Further, in such a case, the amount of relaxation of molecular chain which is highly oriented by stretching becomes large and the strength is lowered; and when used as a thermal transfer ribbon, the film cannot endure the tension of a printer, and undesirably it has a risk of being broken.

Heat Shrinkage Factor

The biaxially oriented film of the present invention preferably satisfies all of the below-mentioned values of (a) to (c) in the heat shrinkage factors both in the longitudinal direction and the transverse direction after heat treatment.

(a) After a 150° C., 30 min heat treatment, the heat shrinkage factor is 3% or less, further preferably 2% or less.

(b) After a 200° C., 10 min treatment, it is 5% or less.

(c) After a 230° C., 10 min heat treatment, it is 10% or less, further preferably 6% or less.

When even one of the ranges of these heat shrinkage factors is not satisfied, the base film shrinks and the dimensional stability becomes poor by the rubbing between the base film and the thermal head, and besides that, there is a risk of wrinkle generation.

Thickness

The biaxially oriented film of the present invention preferably has a thickness in the range of 0.5 to 10 μm. It is more preferable that the upper limit of the thickness is 6 μm, and the lower limit is 2 μm. When the thickness is less than 0.5 μm, the elongative deformation, wrinkle and breakage become extreme, and the ribbon can not be used in a stable state. On the other hand, when the thickness exceeds 10 μm, printing sensitivity decreases, and the length of the ribbon storable in a ribbon cassette becomes short, and resultingly the usability of a printer using the ribbon becomes poor.

Unevenness in Thickness

The biaxially oriented film of the present invention preferably has an unevenness in thickness of 10% or less in the longitudinal direction of a continuous thickness chart obtained by continuously measuring the thickness of the film. A film having an extremely uniform thickness can satisfy the condition, and it can have such an excellent effect that coating unevenness is not generated when a below-mentioned easily adhesive layer is applied on it, and further coating unevenness is not generated also when a thermal transfer ink layer is applied.

The above-mentioned thickness range is achieved by using a known thickness unevenness reducing technique in the film forming process, further by adding the above-mentioned sulfonic acid quaternary phosphonium salt to a polyester and bringing the film-shaped molten matter into strong contact with a cooling drum. Especially, by optimizing the amount of addition of the sulfonic acid quaternary phosphonium salt depending the kind of the polyester and by optimizing also the below-mentioned film forming conditions, a biaxially oriented film which is little in thickness unevenness, and resultingly free from the generation of coating unevenness in the application of an easily adhesive layer and thermal transfer ink layer, can be produced even when a film forming speed is increased.

The thickness unevenness is a value obtained by the following method.

Over 5 m and 1 m in the longitudinal direction and transverse direction of a film, respectively, the thickness is measured continuously by using a electronic micrometer to obtain a continuous thickness chart (figure of the thickness vs. a position), the maximum and the minimum thickness are read out from the chart, and the average thickness is obtained from the film width (cm), length (cm), weight (g) and density (g/cm) by using the equation, Average thickness (μm)=[weight/(width×length×density)]×10000 and the thickness unevenness is calculated by using the following equation.

Thickness unevenness (%)=[(maximum thickness−minimum thickness)/mean thickness]×100

Plane Orientation Coefficient

The biaxially oriented film of the present invention has a plane orientation coefficient of 0.230 or more and 0.275 or less. When the plane orientation coefficient exceeds 0.275, slitting property is insufficient. Further, when it is less than 0.230, the mechanical strength of the film is insufficient.

Density

The density of the biaxially oriented film of the present invention should be 1.3450 g/cm$^3$ or more, preferably 1.3450 g/cm$^3$ or more and 1.3599 g/cm$^3$ or less. When it is smaller than the range, its degree of crystallization is small, and the film is poor in thermal dimensional stability. On the other hand, when the density is larger than the range, the degree of crystallization becomes too large, it causes thickness unevenness, and the planarity of unfavorably poor.

Fine Particles

The biaxially oriented film of the present invention preferably has numerous fine protrusions on the surface of the film in order to impart slipperiness to the film. The numerous fine protrusions can be formed by adding and dispersing fine particles in a copolymerized PET.

The fine particles of the present invention is not affected by the kind, crystal form, specific density and color as far as they can achieve the object of the present invention; however, in order that slipperiness and abrasion resistance of the film are compatible with each other, the particle diameters of the fine particles are preferably homogeneous. From this view point, it is preferable that the fine particles are not natural products but synthetic ones. The average particle diameter of such particles is preferably in the range of 0.01 to 5.0 μm, the amount of addition is preferably in the range of 0.001 to 2.0 wt. %, further preferably in the range of 0.03 to 0.5 wt. %. The kind of the fine particles may be one, or two or more; further, two or more classes of fine particles which are same in kind but different in the average particle diameters may be used in combination.

Hereafter, preferable examples of the biaxially oriented film of the present invention will be explained.

The first example is the case where a kind a porous silica particles, or a combination of porous silica particles and spherical silica particles is added to a copolymerized PEN. The average particle diameter of the porous silica particles is preferably 0.5 to 5 μm, more preferably 1 to 3 μm. Such porous silica fine particles exhibit high affinity to the copolymerized PEN, and are especially effective for improving abrasion resistance.

As an example of a method for producing the porous silica fine particles, a method comprising dispersing primary particles of silica in water to form colloidal particles and drying the sol to form a specific porous gel (JP-A 52-52876) is known.

In order to obtain particles having a specific average particle diameter, a conventionally known particle preparation method can be used, and it is preferable that, for example, pulverization, classification and the like are applied on the particles so that an average particle diameter and particle distribution are adjusted into specific states.

It is preferable that a particle distribution of porous silica particles hardly contains coarse particles of 10 μm or more and has a sharp distribution on the fine particle side. Here, the "average particle diameter" means an "equivalent sphere diameter" of a particle existing on the point of 50 wt. % of the all particles measured. The "equivalent sphere diameter" means the diameter of an imaginary sphere (ideal sphere) having the same volume as that of the particle, and it can be calculated using the data from electron micrographs of particles or measurements by a common sedimentation method. When the average particle diameter of the porous silica particles is less than 0.5 μm, air squeeze property is poor (the rolled-in air is hardly escapable), and thereby wrinkle is apt to be generated, and the slipperiness (slipping property) is insufficient, and thereby workability on a finishing process is unfavorably lowered. On the other hand, when the average particle diameter is larger than 5 μm, the surface of the film is too rough, coating unevenness occurs during ink coating, and when an ink ribbon is produced using the film, unfavorably image-printing unevenness is generated. There is no trouble even if the average particle diameter of the porous silica particles is larger than the thickness of the film. This is because that the porous silica fine particles of the present invention have high affinity to the copolymerized PEN.

In the present invention, the amount of addition of the porous silica particles is preferably 0.1 to 2 wt. %, more preferably 0.1 to 1 wt. % based on the copolymerized PEN. When the amount is less than 0.1 wt. %, the air squeeze property on winding is poor, and on the other hand, when it exceeds 2 wt. %, the surface of the film is too rough, and unfavorably coating unevenness occurs during the coating of ink.

The spherical silica particles preferably used together with the above-mentioned porous silica particles have an average particle diameter smaller than the thickness of the film, and the average particle diameter is 0.01 to 0.8 μm, and their particle diameter ratios (major diameter/minor diameter) are 1.0 to 1.2. The spherical silica particles have spherical shapes extremely close to a perfect sphere in each particle.

The average particle diameter of the spherical silica particles must be smaller than the film thickness. The average particle diameter larger than the film thickness is not preferable because of the occurrence of cracking of the polymer on the peripheries of protrusions attributable to the spherical silica particles, and the frequent occurrence of film breakage in the processes of stretching, thermal fixation or the like. Thereby, the average particle diameter of the spherical silica particles is preferably 90% or less, more preferably 80% or less of the thickness of the film.

Further, the average particle diameter of the spherical silica particles is preferably in the range of 0.2 to 0.8 μm and in the range not exceeding the thickness of the film. The average particle diameter smaller than 0.01 μm is not preferable because of insufficient slipperiness of the film which lowers the workability in manufacturing processes. On the other hand, when the average particle diameter exceeds 0.8 μm, the surface of the film is too rough, and this is not preferred because of the occurrence of coating unevenness during ink application. Further, the particle diameter ratios of the spherical silica particles are preferably 1 to 1.2, more preferably 1 to 1.15, especially preferably 1 to 1.1.

Regarding their manufacturing processes and the others, the spherical silica particles are not restricted as far as they satisfy the above-mentioned conditions. For example, they can be produced by forming singly dispersed spheres of hydrated silica [$Si(OH)_4$] through the hydrolysis of ethyl orthosilicate [$Si(OC_2H_5)]_4$ and subjecting the singly dispersed spheres of the hydrated silica to dehydration to grow the following silica bonding (≡Si—O—Si≡) three dimensionally (Journal of the Chemical Society of Japan, 1981(9) p.1503)

$$Si(OC_2H_5)_4 + 4H_2O \longrightarrow Si(OH)_4 + 4C_2H_5OH$$

$$\equiv Si-OH + HO-Si\equiv \longrightarrow \equiv Si-O-Si\equiv + H_2O$$

In the present invention, the amount of addition of the spherical silica particles is preferably 0.02 to 2 wt. %, more preferably 0.05 to 2 wt. %, further preferably 0.1 to 0.6 wt. %. The amount of addition of 0.05 wt. % or less is not preferable because of insufficient improving effect on slipperiness, and on the other hand, the amount of addition exceeding 2 wt. % is also not preferable because it causes the lowering of film forming property and mechanical strength, and the like. It is not preferred that the content of either porous silica particles or spherical silica particles is too little, because the synergistic effect of using the two kinds of particles is not achieved, and the air squeezing property during winding up and the slipperiness during manufacturing are insufficient.

The second example is the addition of the combination of two kinds of spherical silica particles having different average particle diameters to a copolymerized PEN.

The particle diameter ratios are preferably 1 to 1.2, more preferably 1 to 1.15, especially preferably 1 to 1.1 in both of the two kinds of spherical silica particles.

Further, regarding the average particle diameters of the two kinds of the spherical silica particles (A, B), the particles A have the average particle diameter of preferably 0.5 to 5 μm, more preferably 0.8 to 3 μm, and the particle B have that of preferably 0.01 to 1 μm, more preferably 0.01 to 0.7 μm.

In the particles A, the average particle diameter of less than 0.5 μm is not preferably because of the insufficient slipperiness of the film, and on the other hand, that of larger than 5 μm is also not preferable because of the lowering of the breakage strength of the film. In the particles B, the average particle diameter of less than 0.01 μm is not preferable because of the insufficient slipperiness of the film, and on the other hand, that of larger than 1 μm is also not preferable because the surface of the film is too rough and a space factor becomes too large. The average particle diameter of the spherical silica particles can be larger than the thickness of the film as far as the height of the protrusion is not out of the below-mentioned range.

The amounts of addition of the spherical silica particles are preferably 0.001 to 1.0 wt. %, more preferably 0.03 to 0.5 wt. %, both in the particles A and B.

The timings of the addition of the porous silica particles and the spherical silica particles to the copolymerized PEN are preferably before the polymerization of the copolymerized PEN has been completed, and it is preferably added into the reaction system before the ester interchange reaction has been completed (preferably, as a slurry in glycol). Further, polymers containing the porous silica particles and the spherical silica particles separately are produced, and they can be blended to form a specified composition.

The biaxially oriented film of the present invention can contain optionally an additive, for example, a stabilizer, a dye, an ultraviolet absorbent, a flame retardant and the like besides the above-mentioned particles.

Heights of Protrusions

The surface of the biaxially oriented film of the present invention has a number of protrusions attributable to the above-mentioned particles, and regarding the height, the preferred state is that the density of the protrusions of 0.8 μm or higher is 100 pieces/$mm^2$ or more and 2000 pieces/$mm^2$ or less. When the number of the protrusions is lower than the above-mentioned lower limit, the film to be formed is poor in the winding properties, for example, wrinkles are apt to appear during winding. However, the protrusions of 1.5 μm or higher do not contribute winding property so much, become the causes of the breakage and lower the mechanical strength. So, it is preferable that such protrusions are fewer, and their density is preferably 50 pieces/$mm^2$ or less.

Method for Producing the Biaxially Oriented Polyester Film

The film for a thermal transfer ribbon of the present invention is a biaxially oriented film. The biaxially oriented film is preferably stretched at a stretch radio of 2.5 or more in each of two axial directions (the longitudinal direction and the transverse direction). The stretch ratios of the axial directions may be same to or different from each other. Further, the film may be a mono-layered film or a laminated film.

The film forming method for producing the biaxially oriented film of the present invention is not specifically limited; and for example, a film-shaped molten product which has been melt-extruded at an ordinary extrusion temperature, that is, at a temperature between the melting point (hereafter, referred as Tm) and (Tm+70° C.) is quenched on the surface of a rotary cooling drum to prepare an unstretched film, the unstretched film is stretched at a temperature between the second order transition point (hereafter, referred as Tg) of the copolymerized PEN and (Tg+70° C.) at a stretch ratio of 2.5 to 5.0 in the longitudinal direction, and at need, after the above-mentioned coating material is applied, it is stretched in the transverse direction at a temperature between Tg and (Tg+70° C.) at a stretch ratio of 2.5 to 5.5 to obtain the biaxially oriented film of the present invention. Thus obtained biaxially oriented film is preferably heat-set at a temperature between (Tg+70° C.) and Tm for 1 to 100 seconds.

Further, when a relaxation treatment is applied, it is performed at a point between the finish of the heat-set and the winding up on a roll. Examples of the method of the relaxation treatment include: a method that a tenter which is narrowed in the middle of a heat-setting zone to perform the relaxation of 0 to 30% in the direction of the film width; a method that both the ends of the film are cut off, and the winding speed of the film is decreased On the feeding speed of the film at a temperature between Tg and the melting point of the film; a method that the film is heated with an IR heater between a pair of transport rolls having different speeds; a method that the film is transported on a heating transport roll, and the speed of a transport roll which is placed after the heat transport roll is decelerated; a method that the winding up speed is decelerated from the feeding speed while the film is transported above a nozzle for blowing out hot air after heat-setting; a method that the film is transported on a heating transport roll after the film has been wound up, and the speed of the transport roll is decelerated; and a method that the speed of a roll after a heating zone is decelerated from the speed of a roll before the heating zone while the film is transported through a heating oven or a heating zone having an IR heater. Any of the methods can be used, and the relaxation treatment is carried out at a deceleration ratio of 0.1 to 3% on the winding up side On the feeding side. Further, for controlling the heat shrinkage into the range of the present invention, besides the relaxation treatment, a tension treatment of 0 to 3% may be applied in the film width direction by widening the tenter which in the middle of the heat-setting zone. Such a treatment is not restricted to this method as far as the heat shrinkage of the film is adjustable in the range of the present invention. Further, the treatment is preferably carried out in a heat-setting zone having the highest temperature from a view point of forming a dimensionally stable structure.

Further, at need, a cooling zone is placed, and the film can be cooled to a temperature of around Tg±40° C. of the film. This process is favorable since smooth film having little unevenness in thickness is obtainable.

Easily Adhesive Layer

The biaxially oriented film of the present invention preferably has an easily adhesive layer consisting of at least one kind of aqueous resin (water-soluble or water-dispersible resin) selected from a group of urethane resins, polyester resins, acrylic resins and vinyl resin-modified polyester resins, and laminated on the surface of the side where an ink layer is coated. It is preferable to laminate the easily adhesive layer because this makes adhesivity between an ink layer consisting of a sublimable dye and a resin binder, and a base film strong. As the easily adhesive layer, an epoxy resin, a melamine resin, an oxazoline resin, a vinyl resin or a polyether resin can be used besides the above-mentioned aqueous resin.

Examples of the component constituting the urethane resin to be used for the easily adhesive layer include the following polyhydric compounds, polyvalent isocyanate compounds, chain extenders, crosslinking agents and the like. That is, the polyhydric compounds are, for example, polyethers such as polyoxyethylene glycol, polyoxypropylene glycol and polyoxytetramethylene glycol, polyesters such as polyethylene adipate, polyethylene-butylene adipate and polycaprolactone, polycarbonates, acrylic polyols, castor oil and the like; the polyvalent isocyanate compounds are, for example, tolylene diisocyanate, phenylene diisocyanate, 4,4'-diphenylmethane diisocyanate, hexamethylene diisocyanate, xylylene diisocyanate, 4,4'-dicyclohexylmethane diisocyanate, isophorone diisocyante and the like; and examples of chain extenders or crosslinking agents are ethylene glycol, propylene glycol, diethylene glycol, trimethylolpropane, hydrazine, ethylenediamine, diethylenetriamine, ethylenediamine-sodium acrylate adduct, 4,4'-diaminodiphenylmethane, 4,4'-diaminodicyclohexylmethane, water and the like. The urethane resin can be produced by properly selecting one or more compounds from each group of these compounds and synthesizing a polyurethane by an ordinary polycondensations-crosslinking reaction.

Examples of the component constituting the polyester resin to be used for the easily adhesive layer include the following polyvalent carboxylic acids and polyhydric compounds. That is, examples of the polyvalent carboxylic acids are terephthalic acid, isophthalic acid, orthophthalic acid, 4,4'-diphenyldicarboxylic acid, 2,5-naphthalenedicarboxylic acid, 2,6-naphthalenedicarboxylic acid, 1,4-cyclohexanedicarboxylic acid, 2-(potassium sulfo) terephthalic acid, 5-(sodium sulfo)isophthalic acid, adipic acid, azelaic acid, sebacic acid, dodecanedicarboxylic acid, glutaric acid, succinic acid, trimellitic acid, trimesic acid, trimellitic anhydride, phthalic anhydride, p-hydroxybenzoic acid and trimellitic acid monopotassium salt, their ester forming derivatives and the like; and examples of the polyhydric compounds are ethylene glycol, 1,2-propylene glycol, 1,3-propylene glycol, 1,4-butanediol, 1,6-hexanediol, 2-methyl-1,5-pentanediol, neopentyl glycol, 1,4-cyclohexanedimethanol, p-xylene glycol, bisphenol A-ethylene glycol adduct, bisphenol A-1,2-propylene glycol adduct, diethylene glycol, triethylene glycol, polyethylene glycol, polypropylene glycol, polytetramethylene glycol, polytetramethylene oxide glycol, dimethylolpropionic acid, glycerin, trimethylolpropane, sodium dimethylolethylsulfonate, potassium dimethylolpropionate and the like. The polyester resin can be produced by selecting one or more polyvalent carboxylic acids and one or more polyhydric compounds from these compounds, and synthesizing a polyester by an ordinary polycondensation reaction. Further, a complex polymer having a polyester component such as a polyester polyurethane prepared through chain extending of a polyester polyol with an isocyanate is included in the polyester resin of the present invention besides the above-mentioned ones.

The acrylic resin is preferably composed mainly of an alkyl acrylate or an alkyl methacrylate, and it is a water-soluble or a water-dispersible resin containing 30 to 90 mole % of said component, and 10 to 70 mole % of a vinyl monomer component which is copolymerizable and has a functional group. The vinyl monomer copolymerizable with an alkyl acrylate or an alkyl methacrylate and having a functional group is a vinyl monomer having a carboxyl group or its salt, an acid anhydride group, a sulfonic acid group or its salt, an amide group, an alkylol-modified amide group, an amino group (including a substituted amino group), an alkylol-modified amine group, a salt of these amine groups, a hydroxyl group, an epoxy group or the like, as a functional group. Especially preferable one among these functional groups is a carboxyl group, its salt, an acid anhydride group, an epoxy group or the like. These groups may be contained one or more kinds in the resin. Examples of the alkyl group of the alkyl acrylate or the alkyl methacrylate include methyl, ethyl, n-propyl, isopropyl, n-butyl, isobutyl, t-butyl, 2-ethylhexyl, lauryl, stearyl, cyclohexyl or the like.

As the vinyl monomer which has a functional group copolymerizable with an alkyl acrylate or an alkyl methacrylate, the following compounds having a functional group such as a reactive functional group, a self-crosslinkable functional group or a hydroxphilic group can be used. Examples of the compound having a carboxyl group, its salt or an acid anhydride group include acrylic acid, methylacrylic acid, itaconic acid and maleic acid, salts of a metal such as sodium or ammonium salts of these carboxylic acids, maleic anhydride, and the like. Examples of the compound having a sulfonic acid group or its salt include vinylsulfonic acid and styrenesulfonic acid, salts of a metal such as sodium or ammonium salts of these sulfonic acids and the like. Examples of the compound having an amide group or an alkylol-modified amide group include acrylamide, methacrylamide, N-methylmethacrylamide, methylolacrylamide, methylolmethacrylamide, ureidovinyl ether, β-ureidoisobutylvinyl ether, ureidoethyl acrylate and the like. Examples of the compound having an amino group, an alkylol-modified amino group or a salt of these groups include diethylaminoethyl vinyl ether, 2-aminoethyl vinyl ether, 3-aminopropyl vinyl ether, 2-aminobutyl vinyl ether, dimethylaminoethyl methacrylate and dimethylaminoethyl vinyl ether, compounds obtained by modifying the amino groups of these compounds with methylol, and compounds obtained by quaternizing the amino groups of these compounds with an alkyl halide, dimethyl sulfate, sultone or the like. Examples of the compound having a hydroxyl group include β-hydroxyethyl acrylate, β-hydroxyethyl methacrylate, β-hydroxypropyl acrylate, β-hydroxypropyl methacrylate, β-hydroxyethyl vinyl ether, 5-hydroxypentyl vinyl ether, 6-hydroxyhexyl vinyl ether, polyethylene glycol monoacrylate, polyethylene glycol monomethacrylate, polypropylene glycol monoacrylate, polypropylene glycol monomethacrylate and the like. Examples of the compound having an epoxy group include glycidyl acrylate, glycidyl methacrylate and the like. Examples of the compound having another functional group include vinyl isocyanate, allyl isocyanate and the like. Further, an olefin such as ethylene, propylene, methylpentene, butadiene, styrene or α-methylstyrene, vinyl methyl ether, vinyl ethyl ether, vinyltrialkoxysilane, acrylonitrile, methylacrylonitrile, vinylidene chloride, vinyl chloride, vinylidene fluoride, ethylene tetrafluoride, vinyl acetate or the like is an example of the vinyl monomer compound.

A water-soluble or water-dispersible resin of a vinyl resin-modified resin can be synthesized by copolymerizing a vinyl resin in a water-soluble or water-dispersible polyester resin. Examples of the component constituting the polyester include the following polybasic acids or ester-forming derivatives of the acids, and polyols or ester-forming derivatives of the polyols. That is, the polybasic acid component is terephthalic acid, isophthalic acid, phthalic acid, phthalic anhydride, 2,6-naphthalenedicarboxylic acid, 1,4-cyclohexanedicarboxylic acid, adipic acid, sebacic acid, trimellitic acid, pyromellitic acid, dimer acid or the like. The copolymerized polyester resin is synthesized by using two or more kinds of these acid components. Further, although in small amounts, an unsaturated polybasic acid component such as maleic acid or itaconic acid, and a hydroxy carboxylic acid such as p-hydroxybenzoic acid can be used. Further, the glycol component is ethylene glycol, 1,4-butanediol diethylene glycol, dipropylene glycol, 1,6-hexanediol, 1,4-cyclohexanedimethanol, xylene glycol, dimethylolpropane, poly(ethylene oxide) glycol, poly(tetramethylene oxide) glycol or the like. Two or more of these compounds can be used in combination. Further, the vinyl resin component is such a vinyl monomer as exemplified below. Examples of the vinyl monomer include alkyl acrylates and alkyl methacrylates (the alkyl group is methyl, ethyl, n-propyl, isopropyl, n-butyl, isobutyl, t-butyl, 2-ethylhexyl, cyclohexyl or the like); hydroxy-containing monomers such as 2-hydroxyethyl acrylate, 2-hydroxyethyl methacrylate, 2-hydroxypropyl acrylate and 2-hydroxypropyl methyacrylate, acrylamide, methacrylamide, N-alkylacrylamides, N-alkylmethacrylamides, N,N-dialkylacrylamides and N,N-dialkylmethacrylamides (the alkyl group is methyl, ethyl, n-propyl, isopropyl, n-butyl, isobutyl, t-butyl, 2-ethylhexyl, cyclohexyl or the like); N-alkoxyacrylamides, N-alkoxymethyacrylamides, N,N-dialkoxyacrylamides and N,N-dialkoxymethylacrylamides (the alkoxy group is methoxy, ethoxy, butoxy, isobutoxy or the like); amide-containing monomers such as N-methylolacrylamide, N-methylolmethylacrylamide, N-phenylacrylamide and N-phenylmethyacrylamide; epoxy-containing monomers such as glycidyl acrylate, glycidyl methyacrlate and allyl glycidyl ether; monomers containing a carboxyl group or its salt such as arylic acid, methylacrylic acid, itaconic acid, maleic acid, fumaric acid or crotonic acid, styrenesulfonic acid, or a salt (sodium salt, potassium salt, ammonium salt, tertiary amine salt or the like) of these acids, acid anhydride monomers such as maleic anhydride and itaconic anhydride and monomers such as vinyl isocyanate, allyl isocyanate, styrene, α-methylstyrene, vinyl methyl ether, vinyl ethyl ether, vinyltrialkoxysilanes, alkyl maleic acid monoesters, alkyl fumaric acid monoesters, alkyl itaconic acid monoesters, acrylonitrile, methacrylonitrile, vinylidene chloride, ethylene, propylene, vinyl chloride, vinyl acetate and butandiene. Although the examples of the vinyl monomer include these monomers, the vinyl monomer is not limited to them. These monomers can be copolymerized by using one kind, or two or more kinds.

In the present invention, a coating solution for forming the easily adhesive layer may contain some amount of an organic solvent as far as it does not affect on the above-mentioned water-soluble or water-dispersible resin, or other additives. A necessary amount of a surfactant such as an anionic surfactant, a cationic surfactant or a nonionic surfactant can be added to the coating solution before it is used. As the surfactant, the one which can lower the surface tension of the aqueous coating solution to 40 dyne/cm or less and accelerate wetting of the film of the present invention is preferred, and it is, for example, a poloxyethylene alkylphenyl ether, a polyoxyethylene fatty acid ester, a sorbitan fatty acid ester, a glycerin fatty acid ester, a fatty acid metal soap, an alkylsulfuric acid salt, an alkylsulfonic acid salt, an alkyl sulfosuccinic acid salt, a quaternary ammonium chloride salt, an alkylamine hydrochloric acid, a betaine-type surfactant or the like.

The easily adhesive layer of the present invention may contain an isocyanate compound, an epoxy compound, an oxazoline compound, an aziridine compound, a melamine compound, a silane coupling agent, a titanium coupling agent, a zircoaluminate coupling agent or the like as a crosslinking agent for improving sticking property (blocking property), water resistance, solvent resistance and mechanical strength. Further, an initiating reagent such as a peroxide or an amide may be added when the resin component has crosslinking points, or a sensitizer may be added to a photosensitive resin. Further, the easily adhesive layer may contain silica, silica sol, alumina, alumina sol, zirconium sol, kaolin, talc, calcium carbonate, calcium phosphate, titanium oxide, barium sulfate, carbon black, molybdenum sulfide, antimony oxide sol or the like as inorganic fine particles, a polystyrene, a polyethylene, a polyamide, a polyester, a polyacrylic acid ester, an epoxy resin, a silicon resin, a fluorine resin or the like as organic fine particles. Furthermore, if necessary, the layer may contain an anti-foaming agent, a coating improving agent, a thickener, an antistatic agent, an organic lubricant, an antioxidant, a foaming agent, a dye, a pigment or the like.

A coating solution for forming the easily adhesive layer is applied on one side or both sides of the film preferably before the crystalline orientation is completed in the film manufacturing process of the present invention. The coating can be carried out separately from the film manufacturing process; however in this case, the film is apt to catch dusts or the like, and the contaminated parts become defects on printing; so, this coating process is preferably carried out in a clean atmosphere. Further from view point that an appropriate film can be produced in a relatively low cost, the coating is preferably performed in the film manufacturing process. Commonly, the solid content of the coating solution is preferably 0.1 to 30 wt. %, more preferably 1 to 10 wt. %. The amount of coating is preferably 0.5 to 50 g per 1 $m^2$ of the film on running.

For coating, a known method is applicable. For example, a roll coat method, a gravure coat method, a roll blush method, a spray coat method, an air knife method, an impregnation method, a curtain coat method or the like is applicable single or in combination.

Thermal Transfer Ink Layer

A thermal transfer ribbon can be produced by forming a thermal transfer ink layer on at least one side, especially on one side of the biaxially oriented film of the present invention. The thermal transfer ink layer is not specifically limited, but a known one can be used. That is, the layer can be constituted by compounding a binder component, a coloring component and the like as the main components, and by adding adequate amounts of a softener, a plasticizer, a dispersing agent and the like if necessary. Concrete examples of the main components include, known waxes such as carnauba wax or paraffin wax, or cellulose, polyvinyl alcohol, partially acetalized polyvinyl alcohol, polyamide, various kinds of high-molecular substances having a low melting point or the like as the binder, and mainly a carbon black, and additionally various other kinds of dyes, or organic or inorganic pigments as the coloring agent. Further, the thermal transfer ink layer may contain a sublimable dye; and as the sublimable dye, various kinds of disperse dyes, basic dyes or the like can be used.

As a method for forming the thermal transfer ink layer, a known method, for example, a hot melt coating, or a solution coating such as a gravure method, a reverse method or a slit die method in a solvent-added state can be used. The thermal transfer ink layer is preferably formed on the side of the easily adhesive layer of the biaxially oriented polyester film.

Fusion Prevention Layer

On the surface of the side opposite to the thermal transfer ink layer of the above-mentioned thermal transfer ribbon, a fusion prevention layer is preferably formed to prevent the sticking of a thermal head part. The fusion prevention layer preferably comprises a silicon resin, a resin prepared by crosslinking an acrylate polymer, a methacrylate polymer or their polyester copolymer having crosslinkable functional groups with isocyanate, epoxy, melamine or the like, a fluorine resin, a silicon oil, a mineral oil or the like. The fusion prevention layer can be formed by applying a coating solution containing the above-mentioned components, and the coating can be performed on the film either on-line before the completion of the crystalline orientation or off-line after the biaxial film formation. By this treatment, the heat history during the processing leading into a transfer ribbon can be reduced, and a hardly shrinking film can be obtained.

A known method can be applied for this coating. For example, a roll coat method, a gravure coat method, a roll blush method, a spray coat method, an air knife method, an impregnation method, a curtain coat method or the like is applicable singly or in combination.

EXAMPLES

The present invention will be further explained hereafter with examples.

In the present invention, various kinds of physical properties and characteristics are measured and defined as shown below.

(1) Content of diethylene glycol

A polymer was decomposed by using hydrazine hydrate followed by gas chromatographic determination.

(2) Film-formability

A wire-shaped electrode was placed parallel to a film near a die from which a polymer was melt-extruded into the shape of the film, and a voltage of 7000 volts was applied on the electrode. In this state, a film-shaped molten material was formed by extrusion, and it was brought into close contact with a cooling drum to continuously produce film. In this time, the film formability was observed, and evaluated based on the following criteria.

Rank A: no breakage is detected, and extremely stable film forming is possible.

Rank B: breakage is hardly detected, and stable film forming is possible.

Rank C: breakage is occasionally detected, and film forming is unstable.

Rank D: frequent breakages are detected, and stable film forming is substantially impossible.

(3) Alternating current volume resistivity

An alternating current volume resistivity was determined by using an instrument shown in FIG. 1. Sample films were piled up to about 150 μm in thickness to prepare a measuring sample. An upper electrode 3 to 5.6 cm in diameter and 0.2 cm in thickness, which can keep a parallel gap of 150 μm, was placed on the upper surface of the lower electrode 2 of 20 cm in diameter, and the measuring sample was inserted into the gap so that it came into close contact with the electrodes.

The lower electrode has a built-in voltage-applying device 4 and a temperature detecting element 5, and they were constructed so that the variation of the surface temperatures of the determining surface of the lower electrode was less than 1° C., and the difference of the temperatures between the temperature detection element and the surface was 2° C. or less at a heating rate of 8° C./min. The temperature was measured with a reading thermometer 7. The whole of the electrodes were placed in a heat reserving box 11.

A power source 8 applies its generated voltage between both the electrodes via a standard resistance 9. The power source was the one generating direct current of 100 volts in the case of measuring the direct-current volume resistivity of the film, and it was the one generating alternating-current of 100 volts, 50 Hz in the case of measuring the alternating-current volume resistivity of the film. The current running through the circuit was determined by reading the voltage generated between both the terminals of the standard resistor 9 with an electron meter 10 having an internal impedance of 100 MΩ or more.

In the present invention, the alternating-current volume resistivity of the film was determined by the above-mentioned device at a heating rate of the electrode of 8° C./min and at an electrode temperature of the melting point of the polymer+20° C. (290° C. in the case of polyethylene-2,6-naphthalate), wherein the melting point was determined by a differential scanning calorimeter (DSC), and the alternating-current volume resistivity Z was determined by the following equation using the applied voltage E, the electric current I, the electrode area S and the distance d of the electrodes.

$$Z=(E/I)\times(S/d)$$

(4) Heat shrinkage factor

In each of the ovens which were set at 150° C., 200° C. and 230° C., respectively, a film was held in an unstrained state for each predetermined time (30 min at 150° C.; 10 min at 200° C. or 230° C.), and a heat shrinkage factor was determined from the following equation using the size difference before and after heat treatment.

$$\text{Heat shrinkage factor}=((L_0\cdot L)/L_0)\times 100$$

$L_0$: distance between reference points before heat treatment L: distance between reference points after heat treatment (5) Density Measured according to a sink-float method at 25° C. in a density gradient tube using a calcium nitrate aqueous solution.

(6) Thickness and thickness unevenness of film

Thicknesses were determined by using an electronic micrometer (K-312A) manufactured by Anritsu K.K, at a needle pressure of 30 g and at a running speed of 25 mm/sec over 5 m and 1 m in the longitudinal direction and the transverse direction of a film, respectively to obtain a continuous thickness chart. The maximum thickness and the minimum thickness were read out from the chart. Subsequently, the width (cm), length (cm), weight (g) and density (g/cm$^3$) were measured on the same film, and the average thickness (μm) was calculated from the following equation. Further, the ratio of the difference between the maximum thickness and the minimum thickness to the average thickness was calculated from the following equation, and it was made the thickness unevenness.

$$\text{Average thickness } (\mu m) = [\text{weight}/(\text{width}\times\text{length}\times\text{density})]\times 10000$$

$$\text{Thickness unevenness } (\%) = [(\text{maximum thickness} - \text{minimum thickness})/\text{average thickness}]\times 100$$

(7) Plane orientation coefficient

A plane orientation coefficient NS was determined by measuring a refractive index with an Abbe refractometer using sodium D ray (589 nm) as a light source and calculating from the following equation.

$$NS=(nMD+nTD)/2-nZ$$

In the equation, nMD is the refractive index in the longitudinal direction, nTD is the refractive index in the width direction, and nZ is the refractive index in the thickness direction.

(8) Slitting property

A film roll of 2000 m in length and 500 mm in width was slit to prepare 100 sheets of slit films of 200 m in length and 5 mm in width. The slitting property was evaluated by the number of the slit films containing breakages.

Rank A (excellent slitting property): the number of slit films containing breakage is 1 or less.

Rank B (usable): the number of slit films containing breakage is 4 or less.

Rank C (unusable): the number of slit films containing breakage is 5 or more.

(9) Adhesivity

On the ink layer face of the produced thermal transfer ribbon, a mending tape 810 manufactured by Sumitomo-3M was stuck, and this was rapidly peeled off, the degree of peeling of the ink layer was observed, and the adhesivity was evaluated as follows.

5: No peeling of ink layer was detected.

4: The peeled area of the ink layer was less than 10%.

3: The peeled area of the ink layer was 10 to 30%.

2: The peeled area of the ink layer was 30 to 80%.

1: The peeled area of the ink layer was more than 80%.

(10) Image-printing performance

On an image receiving sheet VY•200 (Hitachi Ltd., standard paper, commercial name), printing was performed at the maximum optical density using a printer Hitachi VY•200 (Hitachi Ltd. commercial name). On the prepared thermal transfer ribbon, image-printing performance and shrinks generated on the ribbon were evaluated based on the following criteria.

○: Clearly printed.

Δ: Image-printing density was inhomogeneous.

X: Shrinks were generated on the ribbon and printing was not neat.

(11) Abrasion property

The state of stain on the roll during film forming and the shape of film roll after winding up were observed, and the abrasion resistance was evaluated based on the following criteria.

Rank A: no stain was detected on the roll, and foreign matters attributable to the abrasion were not in the roll film after winding up.

Rank B: stain was hardly detected on the roll, and foreign matters attributable to the abrasion hardly exist in the roll film after winding up.

Rank C: some stains were detected on the roll, and foreign matters attributable to the abrasion sometime exist in the roll film after winding up.

Rank D: stains were seriously detected on the roll, and a number of foreign matters attributable to the abrasion exist in the roll film after winding up.

Example 1

One hundred parts by weight of a dicarboxylic acid component mixture consisting of 5 mole % of dimethyl isophthalate and 95 mole % of dimethyl 2,6-naphthalenedicarboxylate based on the total dicarboxylic acid components, and 60 parts by weight of a diol component consisting of ethylene glycol were mixed, 0.03 part by weight of manganese acetate tetrahydrate was added to the mixture, and ester interchange reaction carried out while the temperature was lowly elevating from 150° C. to 240° C. At the point when the reaction temperature reached 170° C. on the way of the reaction, 0.024 part by weight of antimony trioxide and further porous silica particles having an average particle diameter of 1.6 μm in such an amount that it became 0.5 wt. % based on the total of the polymer composition were added, and subsequently at the point when the temperature reached to 220° C., 0.042 part by weight (2 mmole % based on the total dicarboxylic acid component) of 3,5-dicarboxybenzenesulfonic acid tetrabutylphosphonium salt was added. Successively, the ester interchange reaction was continued, and after the ester interchange reaction was completed, 0.023 part by weight of trimethyl phosphate was added. Subsequently, the reaction product was transferred to a polymerization reactor, the temperature was elevated to 290° C., and the polycondensation was carried out under high vacuum of 0.2 mmHg or less to obtain a copolymerized PEN having an intrinsic viscosity of 0.61 dl/g determined at 25° C. in o-chlorophenol solution and containing 1.1 mole % of copolymerized diethylene glycol. The diethylene glycol component in the copolymerized PEN polymer was produced as a byproduct from ethylene glycol in the process of the polycondensation reaction.

Subsequently, after dried at 170° C. for 6 hr, the polymer was fed into an extruder, melted at 310° C., and extruded onto a rotary drum having surface finish of 0.3 S and a surface temperature of 50° C. through a slit-shaped die having an aperture of 1 mm to obtain undrawn film.

Thus obtained undrawn film was stretched to 4.5 times in the longitudinal direction at 140° C. On the side of the longitudinally drawn film where no ink layer was to be coated, a coating agent of the following composition was applied as a fusion prevention layer by a gravure coater so that the thickness of the coated film became 0.5 μm after drying, and on the side where an ink layer was to be coated, a coating agent of the following composition was applied as an easily adhesive layer by a gravure coater so that the thickness of the coated film became 0.1 μm after drying. Subsequently, the film was stretched to 3.9 times at 140° C. in the transverse direction, further a heat-setting treatment was applied for 5 sec at the maximum temperature of 240° C., and a 3% tensioning treatment was applied in the width direction at the same time to obtain a biaxially oriented copolymerized PEN film of 3.0 μm in thickness.

<Coating agent composition for fusion prevention layer> acrylic acid ester 14.0 wt. % amino-modified silicone 5.9 wt. % isocyanate 0.1 wt. % water 80.0 wt. %

<Coating agent composition for easily adhesive layer (acrylic+polyester+epoxy resin)>

Acrylic resin 42 solid wt. %

(65 mole % of methyl methacrylate/28 mole % of ethyl acrylate/2 mole % of 2-hydroxyethyl methacrylate/5 mole % of N-methylol acrylamide)

Polyester resin 42 solid wt. %

(acid component: 35 mole % of terephthalic acid/13 mole % of isophthalic acid/2 mole % of 5-sodiumsulfoisophthalic acid; glycol component: 45 mole % of ethylene glycol/5 mole % of diethylene glycol)

Epoxy crosslinking agent 6 solid wt. %

(N,N,N',N'-tetraglycidyl-m-xylylenediamine)

Wetting agent 10 solid wt. %

(laurylpolyoxyethylene)

On the obtained biaxially oriented copolymerized PEN film, an alternating-current volume resistivity, rates of thermal shrinking in the longitudinal and transverse directions, a plane orientation coefficient, a density, film forming property and slitting property were measured and evaluated.

Subsequently, a thermal transfer ink having the following composition was applied on the side of the film opposite to the fusion prevention layer by a gravure coater so that the coating thickness became 1.0 μm to produce a thermal transfer ribbon.

<Thermal transfer ink composition>

Magenta dye (MSRedG) 3.5 wt. %

Polyvinyl acetoacetal resin 3.5 wt. %

Methyl ethyl ketone 46.5 wt. %

Toluene 46.5 wt. %

On the obtained thermal transfer ribbon, the adhesivity of ink and printing property were evaluated. The results of the evaluation are shown in Table 1.

Example 2

Except that the silica particles to be added were change to the combination of 0.5 wt. % of porous silica particles having an average particle diameter of 1.6 μm, and 0.25 wt. % of spherical silica polymers having diameter ratios of 1.05 and the average particle diameter of 0.5 μm based on the whole of the polymer composition, a biaxially oriented copolymerized PEN film was prepared by the way same as in Example 1. Then, a thermal transfer ribbon was prepared from the obtained film by the way same as in Example 1. On the prepared thermal transfer ribbon, the adhesivity of ink and printing performance were evaluated, and the results are shown in Table 1.

Example 3

Except that the silica particles to be added were changed to the combination of 0.3 wt. % of spherical silica particles having diameter ratios of 1.10 and an average particle diameter of 0.8 μm based on the whole of the polymer composition, and 0.1 wt. % of spherical silica polymers having diameter ratios of 1.05 and the average particle diameter of 0.3 μm based on the whole of the polymer composition, a biaxially oriented copolymerized PEN film was prepared by the way same as in Example 1. Then, a thermal transfer ribbon was prepared from the obtained film by the way same as in Example 1. On the prepared thermal transfer ribbon, the adhesivity of ink and printing performance were evaluated, and the results are shown in Table 1.

Example 4 to 6

Except that the ratio of dimethyl isophthalate was changed to the value shown in Table 1, a biaxially oriented copolymerized PEN film was prepared by the way same as in Example 3. Then, a thermal transfer ribbon was prepared from the obtained film by the way same as in Example 3. On the prepared thermal transfer ribbon, the adhesivity of ink and printing performance were evaluated, and the results are shown in Table 1.

Example 7

Except that the ratio of dimethyl isophthalate was changed to 3 mole % and draw ratios were changed to 5.0 and 3.8 in the longitudinal direction and the transverse direction, respectively, a biaxially oriented copolymerized PEN film was prepared by the way same as in Example 3. Then, a thermal transfer ribbon was prepared from the obtained film by the way same as in Example 3. On the prepared thermal transfer ribbon, the adhesivity of ink and printing performance were evaluated, and the results are shown in Table 1.

Comparative Example 1

Except that dimethyl isophthalate was not compounded, a biaxially oriented copolymerized PEN film was prepared by the way same as in Example 3. Then, a thermal transfer ribbon was prepared from the obtained film by the way same as in Example 3. On the prepared thermal transfer ribbon, the adhesivity of ink and printing performance were evaluated, and the results are shown in Table 1. As is clear from Table 1, the film of Comparative Example 1 was poor in slitting property.

Comparative Example 2

Except that the quaternary sulfonium salt was not added, a biaxially oriented copolymerized PEN film was prepared by the way same as in Example 3. Then, a thermal transfer ribbon was prepared from the obtained film by the way same as in Example 3. On the prepared thermal transfer ribbon, the adhesivity of ink and printing performance were evaluated, and the results are shown in Table 1. As is clear from Table 1, the film of Comparative Example 2 was excessive in an alternating-current volume resistivity and poor in film forming property.

Comparative Example 8

Except that draw ratios were changed to 4.9×5.6, a biaxially oriented copolymerized PEN film was prepared by the way same as in Example 3. Then, a thermal transfer ribbon was prepared from the obtained film by the way same as in Example 3. On the prepared thermal transfer ribbon, the adhesivity of ink and printing performance were evaluated, and the results are shown in Table 1. As is clear from Table 1, the film of Comparative Example 3 was excessive in a plane orientation coefficient and poor in film forming property, and image-printing performance could not be evaluated.

Comparative Example 4

Except that the amount of isophthalic acid was changed to 15 mole %, a biaxially oriented copolymerized PEN film was prepared by the way same as in Example 3. Then, a thermal transfer ribbon was prepared from the obtained film by the way same as in Example 3. On the prepared thermal transfer ribbon, the adhesivity of ink and printing performance were evaluated, and the results are shown in Table 1. As is clear from Table 1, the film of Comparative Example 4 was large in a heat shrinkage factor and poor in film forming property.

Comparative Example 5

Except that the heat-setting temperature was changed to 210° C., a biaxially oriented copolymerized PEN film was prepared by the way same as in Example 3. Then, a thermal transfer ribbon was prepared from the obtained film by the way same as in Example 3. On the prepared thermal transfer ribbon, the adhesivity of ink and printing performance were evaluated, and the results are shown in Table 1. As is clear from Table 1, the film of Comparative Example 5 was large in a heat shrinkage factor and insufficient in image-printing performance.

Comparative Example 6

Except that diethylene glycol was additionally added in such an amount that it became 4.2 mole % as the diol component, a biaxially oriented copolymerized PEN film was prepared by the way same as in Example 3. Then, a thermal transfer ribbon was prepared from the obtained film by the way same as in Example 3. On the prepared thermal transfer ribbon, the adhesivity of ink and printing performance were evaluated, and the results are shown in Table 1. As is clear from Table 1, the film of Comparative Example 6 was low in strength accompanying the elongating deformation of the obtained ribbon and large in heat shrinkage, and the image-printing performance was poor.

Example 7

Except that the silica particles to be added were change to calcium carbonate having an average particle diameter of 1.3 μm in an amount 0.5 wt. % based on the whole of the polymer composition, a biaxially oriented copolymerized PEN film was prepared by the way same as in Example 1. Then, a thermal transfer ribbon was prepared from the obtained film by the way same as in Example 1. On the prepared thermal transfer ribbon, the adhesivity of ink and printing performance were evaluated, and the results are shown in Table 1. As is clear from Table 1, the film of Comparative Example 7 was poor in abrasion resistance, had foreign matters mixed in the film roll and was poor in slitting property.

TABLE 1

| | A mole % | B mole % | C mmole % | D $10^8$ Ω cm | E | F g/cm$^3$ |
|---|---|---|---|---|---|---|
| Ex. 1 | 5 | 1.1 | 2 | 1 | 0.254 | 1.357 |
| Ex. 2 | 5 | 1.1 | 2 | 1 | 0.253 | 1.357 |
| Ex. 3 | 5 | 1.1 | 2 | 1 | 0.252 | 1.358 |
| Ex. 4 | 1 | 1.1 | 2 | 1 | 0.258 | 1.358 |
| Ex. 5 | 3 | 1.1 | 2 | 1 | 0.257 | 1.357 |
| Ex. 6 | 7 | 1.1 | 2 | 1 | 0.248 | 1.356 |
| Ex. 7 | 3 | 1.1 | 2 | 1 | 0.264 | 1.353 |
| C. Ex. 1 | 0 | 1.1 | 2 | 1 | 0.258 | 1.358 |
| C. Ex. 2 | 5 | 1.1 | 0 | 8 | 0.254 | 1.357 |
| C. Ex. 3 | 5 | 1.1 | 2 | 1 | 0.281 | 1.355 |
| C. Ex. 4 | 15 | 1.1 | 2 | 0.9 | 0.253 | 1.352 |

TABLE 1-continued

| | | | | | | |
|---|---|---|---|---|---|---|
| C. Ex. 5 | 5 | 1.1 | 2 | 1 | 0.268 | 1.349 |
| C. Ex. 6 | 5 | 4.2 | 2 | 0.8 | 0.228 | 1.349 |
| C. Ex. 7 | 5 | 1.1 | 2 | 1 | 0.254 | 1.357 |

| | Heat shrinkage factor (%) | | | | | | | | | | |
|---|---|---|---|---|---|---|---|---|---|---|---|
| | 150° C. | | 200° C. | | 230° C. | | | | | | |
| | L | T | L | T | L | T | G | H | I | J | K |
| Ex. 1 | 1.4 | 1.7 | 3.4 | 3.5 | 5.2 | 5.8 | A | A | 5 | A | ○ |
| Ex. 2 | 1.3 | 1.7 | 3.5 | 3.4 | 5.2 | 5.7 | A | A | 5 | A | ○ |
| Ex. 3 | 1.4 | 1.8 | 3.4 | 3.5 | 5.1 | 5.8 | A | A | 5 | B | ○ |
| Ex. 4 | 1.3 | 1.6 | 3.2 | 3.5 | 5.0 | 5.7 | A | A | 5 | B | ○ |
| Ex. 5 | 1.4 | 1.7 | 3.4 | 3.5 | 5.1 | 5.8 | A | A | 5 | B | ○ |
| Ex. 6 | 1.4 | 1.7 | 3.5 | 3.6 | 5.3 | 5.9 | A | A | 5 | B | ○ |
| Ex. 7 | 1.6 | 1.7 | 3.6 | 3.7 | 5.0 | 6.0 | A | A | 5 | B | ○ |
| C. Ex. 1 | 1.3 | 1.6 | 3.2 | 3.5 | 4.9 | 5.6 | A | A | 4 | B | Δ |
| C. Ex. 2 | 1.4 | 1.7 | 3.4 | 3.5 | 5.2 | 5.8 | D | C | 4 | B | × |
| C. Ex. 3 | 1.6 | 3.2 | 3.5 | 7.2 | 5.2 | 9.5 | D | B | 5 | B | — |
| C. Ex. 4 | 2.5 | 2.3 | 4.5 | 4.1 | 11.0 | 10.1 | C | C | 5 | B | × |
| C. Ex. 5 | 3.5 | 3.1 | 8.0 | 6.5 | 13.0 | 11.0 | A | A | 5 | B | Δ |
| C. Ex. 6 | 2.6 | 2.4 | 4.6 | 4.2 | 11.3 | 10.1 | B | A | 5 | B | × |
| C. Ex. 7 | 1.4 | 1.7 | 3.4 | 3.5 | 5.2 | 5.8 | B | C | 5 | C | ○ |

In Table 1, abbreviations are defined as follows.
Ex.: Example,
C. Ex.: Comparative Example,
A: Content of isophthalic acid,
B: Content of diethylene glycol,
C: Content of quaternary phosphonium salt,
D: Alternating current volume resistivity,
E: Plane orientation coefficient,
F: Density
L: Longitudinal,
T: Transverse,
G: Film forming performance,
H: Slitting property,
I: Adhesivity,
J: Abrasion resistance,
K: Image-printing performance.

Industrial Field of Application

The present invention enables the production of biaxially oriented polyester film for a thermal transfer ribbon, having excellent productivity [concretely, capability of increasing film-forming speed (high speed film forming performance), resistance to the falling off of particles from the film during film forming (abrasion resistance), and resistance to the breakage of the film during slitting (slitting property)].

Further, the thermal transfer ribbon obtained by laminating a thermal transfer ink layer on the film of the present invention is free from transfer unevenness even on high speed printing and excellent in printing performance.

What is claimed is:

1. A biaxially oriented polyester film for a thermal transfer ribbon wherein it is a biaxially oriented film comprising a copolymerized polyethylene-2,6-naphthalate prepared by polycondensing 90 to 99.9 mole % of 2,6-naphthalenedicarboxylic acid and 0.1 to 10 mole % of isophthalic acid as a dicarboxylic acid component, and 97 to 100 mole % of ethylene glycol component and 0 to 3 mole % of diethylene glycol component as a diol component, the alternating-current volume resistivity of the molten product of the film is $6\times10^8$ Ωcm or less, the plane orientation coefficient of the film is 0.230 to 0.275, and the density of the film is 1.3450 g/$cm^3$ or more.

2. A biaxially oriented polyester film for a thermal transfer ribbon described in claim 1 wherein the thickness of whose film is 0.5 to 10 μm.

3. A biaxially oriented polyester film for a thermal transfer ribbon described in claim 1 wherein the biaxially oriented film comprises a polyester obtained by compounding the copolymerized polyethylene-2,6-naphthalate with a sulfonic acid quaternary phosphonium salt having an ester-forming functional group in an amount of 0.05 to 40 mmole % based on the total amount of the dicarboxylic acid components of the copolymerized polyethylene-2,6-naphthalate, and the alternating-current volume resistivity of the molten product of the film is $0.07\times10^8$ Ωcm to $6\times10^8$ Ωcm or less.

4. A biaxially oriented polyester film for a thermal transfer ribbon described in claim 1 wherein the biaxially oriented film comprises a composition obtained by compounding the copolymerized polyethylene-2,6-naphthalate with 0.1 to 2 wt. % of porous silica particles having an average particle diameter of 0.5 to 5 μm, and has protrusions of 0.8 μm or more existing on the surface of the film at the density of 100/$mm^2$ to 2000/$mm^2$.

5. A biaxially oriented polyester film for a thermal transfer ribbon described in claim 4 wherein the biaxially oriented film comprises a composition obtained by compounding the copolymerized polyethylene-2,6-naphthalate with the porous silica particles and additionally 0.05 to 2 wt. % of spherical silica particles having an average particle diameter of smaller than the thickness of the film and ranging from 0.01 to 0.8 μm, and having particle diameter ratios (major diameter/minor diameter) of 1.0 to 1.2.

6. A biaxially oriented polyester film for a thermal transfer ribbon described in claim 1 wherein the biaxially oriented film comprises a composition obtained by compounding the copolymerized polyethylene-2,6-naphthalate with 0.001 to 1.0 wt. % of spherical silica particles (A) having an average particle diameter of 0.5 to 5 μm and particle diameter ratios (major diameter/minor diameter) to 1.0 to 1.2, and 0.001 to 1.0 wt. % of spherical silica particles (B) having an average particle diameter smaller than that of the spherical silica particles (A) and ranging from 0.01 to 1 μm, and having particle diameter ratios (major diameter/minor diameter) of 1.0 to 1.2.

7. A biaxially oriented polyester film for a thermal transfer ribbon described in claim 1 wherein when the biaxially oriented film is measured by a differential scanning calorimeter, there is a subpeak other than a melting point in the range from 225° C. to 245° C.

8. A biaxially oriented polyester film for a thermal transfer ribbon described in claim 1 wherein protrusions of 1.5 μm or more exist on the surface of the film wherein there are at most 50 of said protrusions per $mm^2$.

9. A biaxially oriented polyester film for a thermal transfer ribbon described in claim 1 wherein shrinkage factors in the longitudinal direction and the width direction after a treatment at 150° C. for 30 min are each 3% or less, shrinkage factors in the longitudinal direction and the width direction after a treatment at 200° C. for 10 min are each 5% or less, and shrinkage factors in the longitudinal direction and the width direction after a treatment at 230° C. for 10 min are each 10% or less.

10. A biaxially oriented polyester film for a thermal transfer ribbon described in claim 1 wherein an adhesive layer is laminated on at least one side, wherein said adhesive layer is obtained by applying a coating solution containing an aqueous resin of at least one kind selected from a group consisting of a urethane resin, a polyester resin, an acrylic resin and a vinyl resin-modified polyester resin, on a film whose orientation crystallization has not been completed yet, and subsequently drying, stretching and heat setting.

* * * * *